March 19, 1963 G. A. RETER 3,082,299
ALARM TESTING DEVICE
Filed Aug. 18, 1960 3 Sheets-Sheet 1
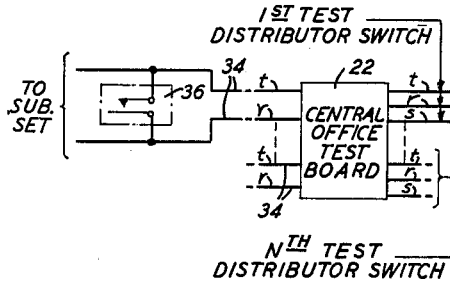
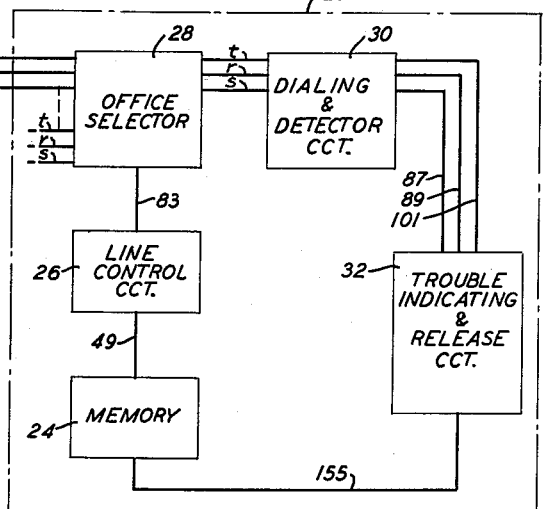
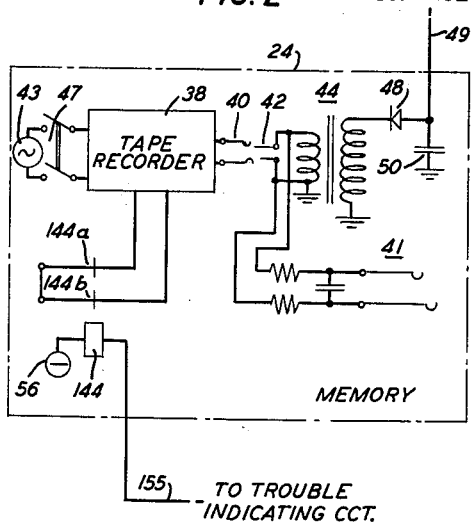
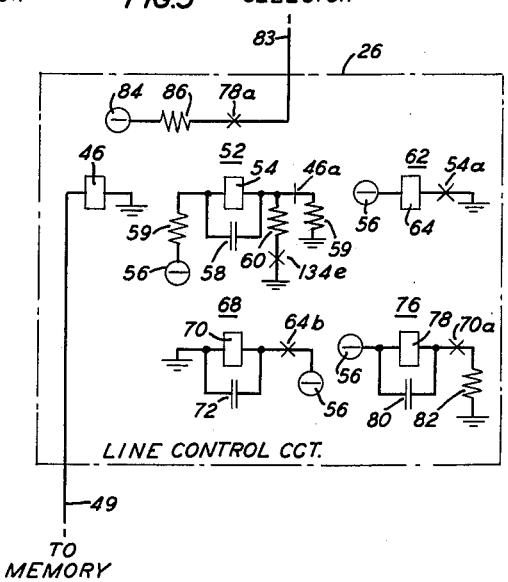
INVENTOR
G. A. RETER
BY Joseph C. Redmond, Jr.
ATTORNEY March 19, 1963 G. A. RETER 3,082,299
ALARM TESTING DEVICE
Filed Aug. 18, 1960 3 Sheets-Sheet 2

INVENTOR
G. A. RETER
BY Joseph C. Redmond Jr.
ATTORNEY

March 19, 1963     G. A. RETER     3,082,299
ALARM TESTING DEVICE
Filed Aug. 18, 1960     3 Sheets-Sheet 3
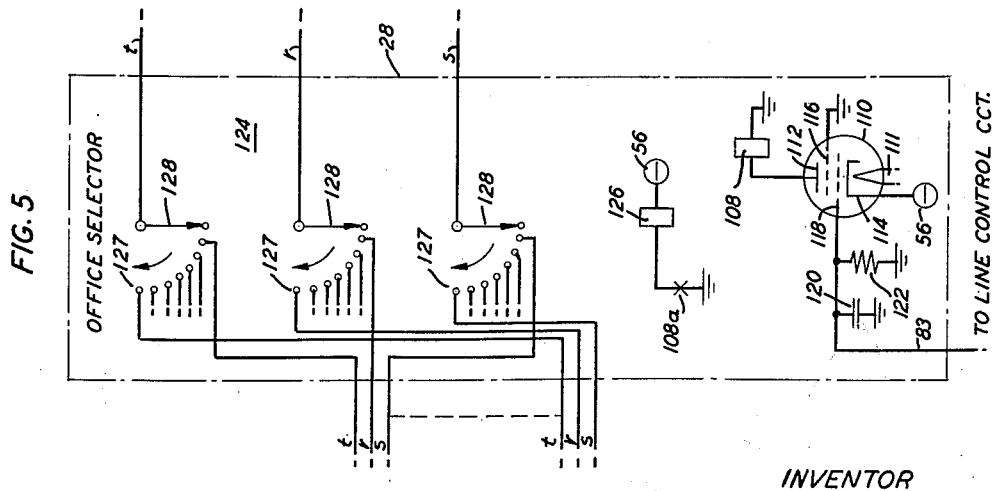
INVENTOR
G. A. RETER
BY Joseph C. Redmond
ATTORNEY

United States Patent Office 3,082,299
Patented Mar. 19, 1963

3,082,299
ALARM TESTING DEVICE
George A. Reter, Lynnhaven, Va., assignor to American Telephone and Telegraph Company, New York, N.Y., a corporation of New York
Filed Aug. 18, 1960, Ser. No. 50,451
7 Claims. (Cl. 179—175.2)

This invention relates to alarm testing devices and more particularly to an automatic alarm testing device for inspecting and indicating operated alarm devices, typically gas pressure contactors.

Because of low maintenance costs, telephone companies are finding increased use for gas pressurized cables in exchange area outside plant construction. Gas pressurized cables, as is well known, are monitored by a plurality of contactors or alarm devices. Each contactor or alarm device monitors a particular section of the cable and is adapted to close when the gas pressure in the monitored section drops below a preselected value due to leaks or other conditions. Normally, the alarm devices are inspected at routine intervals, the inspection being performed at a central office by a skilled technician. For economic reasons, it is desirable that an automatic testing device be developed to perform the routine testing and inspection of the alarm device without the full time attention of a skilled technician.

There are any number of automatic testing devices for performing routine tests and inspections of telephone lines and equipment. Such prior art testing means are, however, relatively inflexible in that they employ a "wired-in" test program which is relatively slow and difficult to change when additions to or alterations occur in the number of alarm devices. Moreover, such prior art devices do not provide positive identification of a defective or operated alarm device when encountered, such identification being made at the end of the test cycle thereby requiring further effort on the part of a skilled technician to relocate the defective alarm device. With the use of pressurized cable becoming more prevalent in exchange area outside plant construction, it is desirable that an easily alterable inspection program be provided which is carried out automatically without the need of a skilled technician until a defective or operated device is encountered. Furthermore, it is also desirable that an alarm testing device be provided which gives positive identification of a defective or operated alarm device at the same time the device is located thereby minimizing the services of the skilled technician in conducting the inspection program.

A general object of the present invention is an easily alterable alarm testing device which automatically and progressively inspects from a central location a plurality of alarm devices remotely located from said central location.

One object of the invention is an inexpensive alarm testing device which provides positive and accurate audio and visual signals indicative of a defective or operated alarm device.

Another object is a portable alarm testing device located at a central office and requiring no wiring changes in the office when alterations occur in the number and location of alarm devices.

These objects are accomplished in accordance with this invention, one illustrative embodiment of which comprises a plurality of alarm devices or contactors located on a gas pressurized cable system, the contactors being connected to selected subscriber lines which are accessible to a test desk located in a central office. Each alarm device is adapted to indicate a low resistance condition on the subscriber line associated therewith when the cable pressure is reduced by leaks or other conditions. Associated with the test desk is an automatic testing device which is compact in size and portable and comprises a memory unit for supplying prerecorded signals to the switching equipment associated with the test desk, the equipment successively connecting the alarm testing device to each subscriber line having an alarm device connected thereto. Each subscriber line, when contacted, is inspected by a detector circuit for resistance level. The inspection proceeds continuously until a trouble indicating circuit responsive to the detector indicates by suitable signals the presence of a low resistance condition on a subscriber line, the circuit thereafter stopping the operation of the testing device at the troubled line. When the apparatus is restarted, pre-recorded voice signals from the memory unit positively and accurately identify the defective alarm device to permit repair of the line and resetting of the alarm device.

A feature of the present invention is a plurality of alarm devices, typically gas pressure contactors, each connected to a subscriber line served from a central office, the alarm devices being progressively inspected for operating state by an automatic alarm testing device.

Another feature of the invention is a programmed alarm testing device having means for translating program information from one form into another form suitable for operating dialing and detection equipment to inspect a plurality of alarm devices.

Still another feature is an erasable memory device in an alarm testing device, the memory device permitting changes in the program of said device in accordance with alterations in the number and location of alarm devices.

Further objects and features of the present invention will be more fully apprehended from the following detailed specification taken in conjunction with the appended drawing in which:

FIG. 1 is a block diagram of one illustrative embodiment of the present invention;

FIG. 2 is a schematic circuit diagram of a memory unit included in the present invention shown in FIG. 1;

FIG. 3 is an electrical schematic of a line control circuit included in the invention shown in FIG. 1;

FIG. 5 is an electrical schematic of an office selector and advance circuit included in the invention shown in FIG. 1;

FIG. 6 is an electrical schematic of a trouble indicating and recorder stop and release circuit included in the invention shown in FIG. 1.

Figure 4:
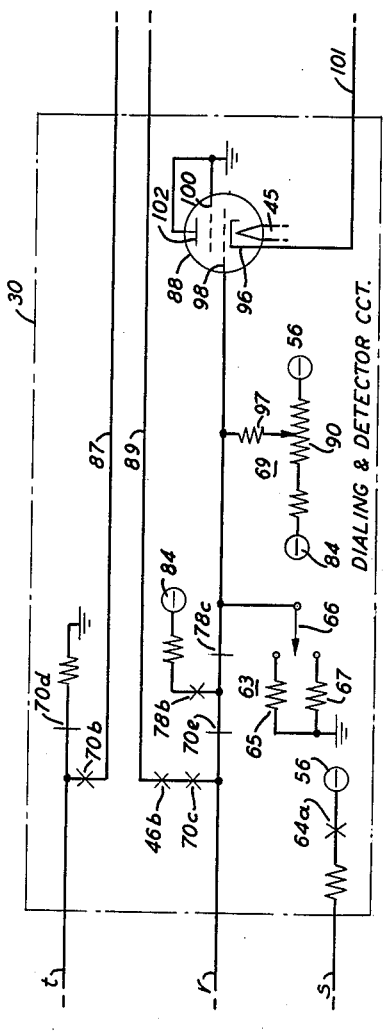
FIG. 4 is an electrical schematic circuit diagram of a dialing and detector circuit included in the invention shown in FIG. 1.

Referring to FIG. 1, an alarm testing device 20 incorporating the principles of the present invention and shown in the blocked out lines indicated in FIG. 1 is connected to a conventional test board 22 included in a central office, the test board being described, for example, in United States Patent No. 1,598,890 to R. L. Stokely issued September 7, 1926. The alarm testing device 20 is connected successively, as will be explained hereinafter, through the ring, tip and sleeve lines of each test distributor switch (not shown) associated with the test board. Included in the alarm testing device are a memory unit 24, a line control circuit 26, an office selector 28, a dialing and detector circuit 30 and a trouble indicating and release circuit 32, all of which will be more fully described hereinafter.

Each test distributor switch (not shown) associated with the test board, as is well known, provides access to subscriber lines 34 in an assigned exchange area for testing purposes. Each subscriber line 34 to be tested, only one of which is shown for each exchange area, has a pressure operated contactor or alarm device 36 connected thereto. The alarm devices monitor the various sections of a pressurized cable. Each alarm device is adapted to close when the gas pressure in the monitored cable section falls below the preselected value for any reason as, for example, a leak or puncture. Upon closure the alarm device places a low resistance condition on the subscriber line 34, the low resistance condition being indicative of an operated alarm device or some trouble condition on the pressurized cable.

Turning now to the individual components of the alarm testing device, the memory unit 24, as shown in FIG. 2, includes a conventional tape recorder unit 38 connected to a source 43 of suitable current by a start switch 47 of any type that is commercially available. The recorder includes a remote control circuit for stopping and starting the tape reel (not shown). The remote control circuit comprises contacts 144a and 144b which are operated by a stop relay 144, the relay being energized from a suitable source 56 of direct current and connected through lead 155 to the trouble indicating circuit (see FIG. 6) as will be explained in more detail hereinafter. The contacts 144a and 144b are normally closed and an arbitrary designation of a single vertical line is assigned to indicate such a condition of the contacts. For open contacts, a crossed line designation is hereinafter assigned to indicate such a condition of the contacts.

The recorder output is supplied through an output jack 40 and a plug member 42 to a conventional current stepup transformer 44 of suitable rating for operating a relay device with the current appearing at the output jack. The plug member is also connected to a jack circuit 41 for test purposes as will also be explained hereinafter. The output of the memory unit which originates at the pick-up head (not shown) of the recorder is an alternating current signal corresponding to the signals recorded on the tape unit (not shown) of the recorder. Upon application to the transformer 44, the alternating current signals are converted into direct current pulses for operating by way of lead 49 a pulsing relay 46 (see FIG. 3). A conventional pulse forming circuit employing a selenium rectifier 48 and capacitor 50 suitably connected between the transformer and the pulsing relay enable the alternating current signals from the tape recorder to be converted into direct current pulses to operate the pulsing relay.

The pulsing relay 46 shown in FIG. 3 operates contacts in both the line control circuit 26 (FIG. 3) and the dialing and detector circuit 30 (FIG. 4). For simplicity and ease of understanding, contacts operated by the pulsing and other relays described in the present invention have alpha-numeric designations corresponding to the relay numerical designation and alphabetic designation of the contacts operated by the relay. Thus, in the case of relay 46 which operates two sets of contacts the first set of contacts is designated 46a, these contacts being employed in the line control circuit. The second set of contacts is designated 46b, these contacts being employed in the dialing and detector circuit (see FIG. 4).

Considering first the line control circuit 26, shown in FIG. 3, which is adapted to control the sequence of operations among the various elements of the present invention, the pulsing relay contacts 46a are located in a first timing relay circuit 52 including a relay 54 having a four second release time and connected between the supply 56 and ground. A capacitor 58 connected across the coil of the relay 54 provides the desired timing interval for the circuit. Also included in the relay circuit are dropping resistors 59, to permit the connection of the timing circuit to the source 56, and a lock up circuit consisting of contacts 134e and a resistor 60 of suitable size in series for connecting the relay 54 to ground. The pulsing relay contacts 46a are shown in their normal or closed condition which places the first timing relay circuit in the operated condition. The lock up contacts 134e are normally open but, when closed, hold the relay 54 in the operated condition until relay 134 (see FIG. 6) releases.

The timing relay circuit 52 operates a set of contacts 54a in a first relay circuit 62 which includes a conventional relay 64 connected between the supply 56 and ground. Relay contacts 54a are shown in their open condition which normally places the first relay circuit 62 in the unoperated condition. Relay circuit 62 operates a first set of contacts 64a in the sleeve line of the dialing and detector circuit (see FIG. 4) and a second set of contacts 64b in a second timing circuit 68.

Included in the second timing circuit is a relay 70 having a three second release time and connected between the supply 56 and ground. A capacitor 72 is connected across the relay 70 for timing purposes. The relay contacts 64b are shown in the normally open condition which places the second timing relay circuit 68 in the unoperated condition.

The second timing circuit operates a first set of contacts 70a in a third timing circuit 76 as well as contacts 70b, 70c, 70d and 70e in the dialing and detector circuit (see FIG. 4) and contacts 70f and 70g in the trouble indicating and recorder stop circuit (see FIG. 6).

Included in the third timing circuit 76 is a relay coil 78 having a one second release time and connected between the supply 56 and ground. A capacitor 80 is connected across the relay 78 for timing purposes. Also included in the third timing relay circuit is a dropping resistor 82 to permit the connection of the relay 78 between the direct current supply 56 and ground. The contacts 70a are normally in their open condition which places the third timing circuit in the unoperated condition. The third timing circuit operates a first set of contacts 78a which connects a negative direct current supply 84 of suitable magnitude through a dropping resistor 86 and lead 83 to the office selector circuit 28 (see FIG. 5) for reasons to be explained in more detail hereinafter. The third timing circuit also operates contacts 78b and 78c in the dialing and detector circuit (see FIG. 4).

Return now to the second set of contacts 46b operated by the pulsing relay, these contacts being located in the dialing and detector circuit shown in FIG. 4. The latter circuit is adapted to dial the various subscriber lines in response to the signals originating from the memory unit; test each line for a busy condition; and, finally inspect each line for resistance level. The dialing and detector circuit comprises a detector 88 and the pulsing contacts 46b located in busy test leads 87 and 89 which are connected between the ring and tip lines of the office selector circuit (see FIG. 1). Connected across the busy test leads is polar relay 91 (see FIG. 6) of the trouble indicating circuit.

The detector comprises a conventional tetrode 88, typically a 50B5 vacuum tube, a calibrating circuit 63 and a potentiometer 90 having associated therewith a movable arm 69 which includes a resistor 97. The ends of the potentiometer are connected between the supplies 56 and 84 which are at different potentials. The calibrating circuit comprises a key device 66, a pair of resistors 65 and 67, typically 500,000 ohms and 400,000 ohms, respectively. The calibrating key 66 and the movable arm 69 of the potentiometer are connected together and thence to grid 98 of the tetrode tube. The voltage applied to the grid appears across the resistor 97. The tetrode contains a heater 45 energized from a suitable supply (not shown), a cathode 96 connected by way of lead 101 to the trouble indicating circuit (see FIG. 6), a screen grid 100 and a plate 102 which are connected together and thence to ground.

The calibrating circuit and the potentiometer are adapted to set the cutoff and operating points of the tetrode 88. This is accomplished by setting the key 66 on the 400,000 ohm resistor 65 and adjusting the movable arm 69 until the tube 88 conducts. Next, the key 66 is positioned on the 500,000 ohm resistor 67 and the movable arm 69 is adjusted until cutoff of the tube 88 occurs. Thereafter the arm 69 is adjusted to a position midway between the previously described settings so that the tube will conduct for resistances in the vicinity of 400,000 ohms or less but will be cut off for resistances approximately 500,000 ohms or greater.

To prevent the detector from being operated by low resistance conditions due to the charging of line capacitances, source 84 is connected through a suitable resistance to the ring line to charge the line before the detector is connected to the line. The contacts 78c and 78b are timed to operate in the correct sequence for this result.

The dialing and detector circuit is connected through the contacts 70d, 70e and 64a and ring, tip and sleeve lines to the office selector circuit (see FIG. 1). The latter circuit selects one of the several distributor switches associated with the test board to permit testing of the subscriber lines having contactors thereon. The contacts 70b and 70c are arranged, as will be seen hereinafter, to connect the dialing circuit to the ring and tip lines when the detector is disconnected therefrom and to connect the detector circuit to these lines when the pulsing circuit is disconnected therefrom. The contact 64a, when closed, applies battery to the selected test distributor switch to place said switch in condition for accepting dial pulses.

In FIG. 5 the office control and advance circuit, as previously indicated, is adapted to select among the test distributor switches associated with the test board (see FIG. 1) for the various exchange areas. The circuit, as shown in FIG. 5, comprises a gating circuit for connecting and disconnecting a relay 108 between ground and the supply 56. The gating circuit includes a tetrode 110, typically a 50B5 vacuum tube, having a heater 111 energized from a suitable supply (not shown), a plate 112 connected to the ungrounded end of the relay 108 and a cathode 114 connected to the supply 56. Screen 116 and grid 118 of tube 110 are connected to ground and to the line control circuit, respectively, the latter connection being by way of the lead 83. Completing the connections of the tube 110 is a timing circuit including a capacitor 120 and a resistor 122 in parallel and connected between the grid 118 and ground. The timing circuit has a time constant greater than six seconds for reasons to be explained hereinafter.

The relay 108 operates a set of contacts 108a which connect a conventional selector stepping switch 124 to the supply 56 for operation thereof. The stepping switch 124 shown in the start position includes a relay 126 and three multicontact levels designated ring, sleeve and tip levels. Each level has a plurality of contacts 127 therein. Each contact in a level is connected to the corresponding r, t and s line of the test distributor switch associated with a different exchange. The three leads from corresponding contacts in each level to each of the various test distributor switches are designated as output circuits of the office selector circuit. The stepping switch also includes a movable arm 128 for each level, the arms being multipled together and connected through ring, sleeve and tip lines to the dialing and detector circuit. Suitable circuitry, not shown but which is also well known in the art, is included in the stepping switch to reset the switch to the start position when the switch is advanced beyond the last contact position on the levels.

As the movable arms 128 advance from one contact to the next in their respective levels, a different test distributor switch is connected to the dialing and detector circuit for dialing of the various subscriber lines to which the test distributor switch has access for testing purposes. The trouble indicating and release circuit, shown in FIG. 6, indicates when a low resistance condition is encountered on a subscriber line by the dialing and detector circuit. Included in the trouble indicating circuit are the polar relay 91 having a main coil 92, an opposing coil 93 and a tertiary coil 94. The main coil is energized from the source 56 and connected to ground through a resistor 95 which permits current flow of a preselected value through the coil 92. The opposing coil is connected through the lead 101 to the cathode of the detector tube. When energized, sufficient current flows through the opposing coil to nullify the effect of the main coil thereby causing operation of the contacts 91a of the polar relay. Similarly, the tertiary coil 94 when connected by the leads 87 and 89 across the ring and tip lines during a busy condition thereon receives sufficient current to nullify the effect of the main coil field to cause operation of the contacts 91a. In the absence of a busy condition on the ring and tip lines, the tertiary coil field does not oppose the main coil field. Also included in the trouble indicating circuit are trouble and busy relays 132 and 134, respectively, which operate contacts 132a through e and 134a through d, respectively. The relays 132 and 134 are connected in parallel, one end of the parallel connection being connected to the supply 56 through a resistor 136, the other end of the parallel connection being connected to ground through the polar relay contact 91a which is normally open.

In order to permit a separate busy test and resistance inspection to be made of a subscriber line by the present invention, the trouble indicating circuit is arranged to prevent operation of the busy and trouble relays at the same time. This is accomplished by the second timing relay circuit 68 (in FIG. 3) operating contacts 70f in the busy relay circuit and contacts 70g in the trouble relay circuit, the former contacts being normally open whereas the latter contacts are normally closed. Hence, in either the normal or operated condition of the second timing circuit, the busy or trouble relay is disconnected from the source 56 to prevent operation thereof. As a further precaution against the busy and trouble relays operating together, the contacts 132a in the busy relay circuit are operated by the trouble relay to disconnect the busy relay from the supply 56 when the trouble relay operates.

The busy and trouble relays, when operated, close contacts 132b and 134a, respectively, the former contact locking up the trouble relay ahead of the contacts 70g whereas the latter contact locks up the busy relay through a varistor 146 and a skip busy key 148 having two sections, one of which is in the relay circuit and the other of which is in a lamp circuit to be described hereinafter. Both the busy and trouble relays can be released from an operated condition by closing a release key 140 which grounds the supply 56 ahead of the relays. Also a jack 142, located at the test board, grounds the supply 56 ahead of the trouble and busy relays to prevent operation thereof when the jack is engaged by a plug (not shown).

The trouble indicating circuit by means of the trouble and busy relays is adapted to terminate the operation of the memory unit upon either a trouble or busy condition on a subscriber line under test. The trouble relay, when operated, closes the contacts 132c which connects the stop relay 144 (see FIG. 2) included in the tape recorder through the lead 155 to ground, causing operation thereof. The stop relay opens the contacts 144a and 144b (see FIG. 2) in the remote control circuit to stop the tape recorder. Similarly, the busy relay, when operated, stops the tape recorder by closing the contacts 134b which connects the stop relay 144 to ground through the skip busy key 148 provided said key is closed.

In the event that the skip busy key is disconnected from ground, the stop relay cannot operate when the busy relay operates and the tape recorder continues to operate as will be described in more detail hereinafter. With the skip busy key open, the varistor 146 prevents ground from being applied to the stop relay through the operated contacts 134a and 91a of the busy relay and the polar relay, respectively.

In addition to terminating operation of the tape recorder, both the trouble and busy relays close contacts to light individual lamps at the test board, the illuminated lamps being indicative of the operated relay. The trouble relay operates the normally open contact 132d which connects a low voltage supply 149 of direct current to a lamp 151 of any color which designates the operation of the trouble relay. The lamp can be located at the test desk or on the chassis of the present invention or in both locations. The trouble relay also closes the normally open contact 132e which supplies direct current to a buzzer 150 located at the test board for sounding thereof. Similarly, with the skip busy key closed, the busy relay, when operated, closes the normally open contact 134c which connects the low voltage supply 149 through the second section of the key to a lamp 152 having a color different from the lamp 151 assigned to the operation of the trouble relay. With the skip busy key open, it is evident that the lamp 152 will not operate when the busy relay operates. Finally, the busy relay closes the normally open contact 134d which supplies current to the buzzer 150 located at the test board, provided the skip busy key is closed. With the skip busy key open, the contacts 134d close but do not apply battery to the buzzer.

Having described the various elements and circuit arrangements, the remaining paragraphs hereinafter will be devoted to the operation of the present invention.

Before operation of the present invention can proceed, it is necessary to prepare a tape for the recorder, the tape having signals thereon corresponding to the numbers of the subscriber lines 34 on which are located the various contactors 36 or alarm devices. In addition, signals are required to be placed on the tape which start and stop the present invention, as well as to permit the selection of one of the various test distributor switches associated with the test board. Between the subscriber dial signals, a ten second signal is given followed by a voice signal reciting the previously dialed subscriber line number.

A tape of the type previously described is easily prepared with the use of a conventional tape recorder and a frequency generator. To prepare the tape, the recorder is set to record and the frequency generator operated to produce a signal of sufficient strength for recording purposes. Subscriber line numbers are duplicated on the tape by interrupting the tone signal with a conventional pulsing mechanism suitably connected to the frequency generator, the number of interruptions being analogous to the respective subscriber line numbers. For reasons indicated hereinafter, the time between interruptions in the tone signals corresponding to the subscriber line numbers must be individually less than the release time of the first timing relay circuit which in the present embodiment is approximately four seconds.

At the end of each recorded subscriber line number, the tone signal is terminated after ten seconds and a voice message indicating the previously dialed subscriber line and contactor numbers tested is placed on the tape. Following the voice message, the tone signal is reapplied to the tape and interrupted in the manner previously described to encode the next subscriber line number. This process is continued until all of the subscriber line numbers in an exchange have been recorded.

Before and after recording the subscriber line numbers in an exchange area, a long tone signal of approximately 45 seconds' duration followed by a tone break of approximately five seconds long is placed on the tape. The signal, as will be seen hereinafter, operates the office selector and advance circuit to select one of the test distributor switches for receipt of the subscriber dial pulses. The five second tone break sets the relays in the line control circuit for the pulsing operation of the present invention.

After all legitimate subscriber numbers have been recorded, a telephone number is placed on the tape which connects the present invention to a permanent trouble source. The trouble number causes the present invention to terminate the operation of the tape recorder. Immediately after the trouble number, a voice message is recorded on the tape informing an attendant that the test cycle has been completed. This message permits the attendant to take the necessary action to rewind the tape for the next testing cycle.

Figure 7:
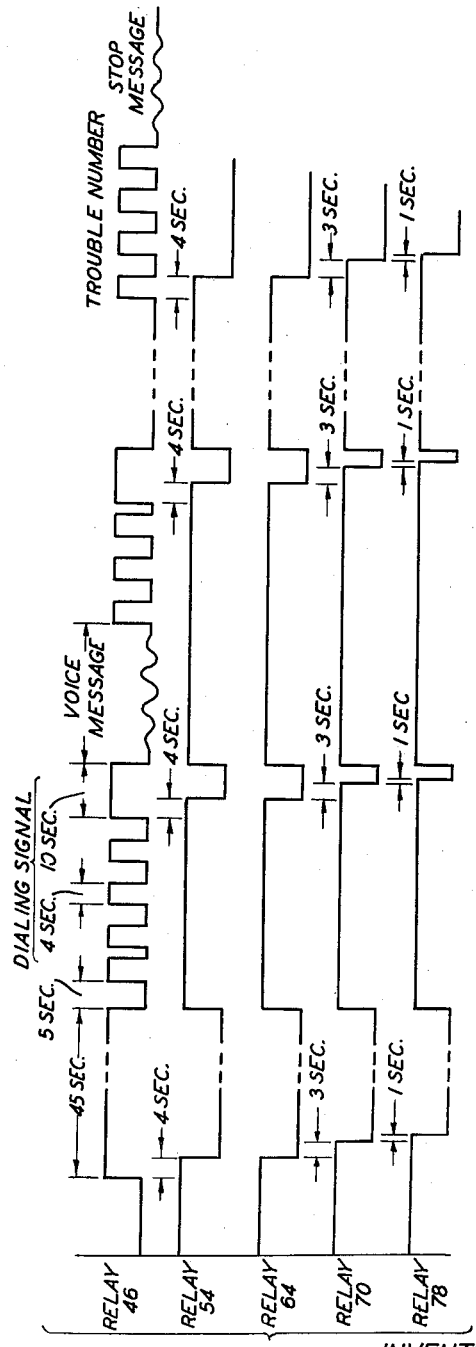
FIG. 7 is an operating chart for the relays included in the line control circuit shown in FIG. 3.

To start a test cycle the direct current supplies 56, 84 and 149 are suitably connected to the present invention by means not shown. Next, the tape is loaded in the tape recorder which is permitted to warm up before the tape is driven past the pick-up head (not shown) thereof. The first signal after start of the tape is the long tone signal of approximately 45 seconds' duration followed by the five second tone break. The long tone causes the pulsing relay 46 to hold up and the line control circuit relays 54, 64, 70 and 78 to release in a time sequence as shown in FIG. 7. Release of the relay 64 closes the contacts 64a to connect the supply 56 to the test distributor switch (not shown) associated with the test board to place said switch in condition to accept dial pulses. Release of the relay 78 opens the contacts 78a which disconnect the supply 84 from the office selector and advance circuit (see FIGS. 3 and 5).

When the supply 84 is disconnected from the office selector and advance circuit for more than six seconds, the timing circuit comprising capacitor 120 and resistor 122 discharges to ground thereby removing the cutoff bias and placing the tube 110 in the conductive state. As a result, the relay 108 operates thereby closing the contacts 108a and causing the selector stepping switch 124 to advance the movable arms 128 to the first contact position in each level. In this position of the stepping switch, the dialing and detector circuit is connected to the first test distributor switch (not shown) associated with the test board, said distributor switch being previously placed in condition to accept dial pulses from the dialing and detector circuit.

With the appearance of the five second tone break on the tape, the line control circuit relays are operated and the present invention is ready to start dialing.

Immediately following the five second tone break, the tone signal reappears and interruptions occur therein corresponding to the subscriber line numbers. The pulsing relay, as shown in FIG. 7, follows the tone signal and releases upon each interruption. On release of the pulsing relay, the line control circuit relays 54, 64, 70 and 78 hold up and remain held up. When the pulsing relay recloses upon the reappearance of the tone signal, the line control circuit relays do not release since the length of the tone signal is less than four seconds which is the release time of the first timing relay circuit. Since the first timing circuit cannot release during this interval, the other relays in the line control circuit cannot release either because their operation is controlled by relay 54, as previously explained.

With the line control circuit relays held up during pulsing, the contacts 70b and 70c in the dialing and detector circuit shown in FIG. 4 are closed completing the pulsing path for the contacts 46b which are operated by the pulsing relay. Pulsing contacts 46b close and make to drive the test distributor switch to the first subscriber line to be inspected. During the pulsing period, the contacts 70d and 70e in FIG. 4 are open which disconnects the detector circuit from the ring and tip lines. The contact 78a is closed which connects the supply 84 to the office selector and advance circuit to prevent conduction of the tube 110 and operation of the stepping switch 124.

During the pulsing of contacts 46b, the tertiary coil 94 is connected by the leads 87 and 89 across the ring and tip lines to perform a busy test on the subscriber line connected thereto. If the subscriber line is busy, the current flow through the tertiary coil produces flux which opposes that of the main coil 92 to cause operation of the polar relay 91. Turning now to FIG. 6, closure of the contacts 91a completes the electric circuit of the busy relay 134. The contacts 70f included in the busy relay electric circuit are closed since the relay 70 is held up during the pulsing transmission of the dialing and detector circuit as shown in FIG. 7. The contacts 132a, also included in the busy relay circuit, are closed since the trouble relay is at this point still in the normal condition.

Upon operation of the relay 134, the contacts 134a and 134b are closed, the latter locking up the relay 134 through the varistor 146 and the closed skip busy key 148 and the former completing the electric circuit of the stop relay 144 which operates contacts 144a and 144b to terminate the operation of the tape recorder. The relay 134, when locked up, also closes the contact 134e (see FIG. 3) and locks up the first timing relay circuit 52. In the event that the skip busy key 148 is open, the electric circuit of the stop relay 144 cannot be completed as previously described. As a consequence, the tape recorder does not stop nor is the resistance test carried out on the subscriber line. The resistance test is not carried out because the relay 54 is locked up by the closing of the contacts 134e which are operated by the busy relay. With the relay 54 held up, the relays 70 and 78 are operated, which opens the contacts 70d, 70e and 78c to disconnect the detector from the subscriber line.

With the skip busy key 148 closed and the busy test relay 134 held up, the lamp 151 is energized by operation of the contacts 134c and the buzzer 150 is sounded because of the operation of the contacts 134d. The busy relay can be released by the attendant plugging into the test jack 142 or closing key 140 which disconnects the supply 56 from the busy relay circuit. Release of the busy relay restarts the tape recorder since the contacts 134a open and the contacts 144a and 144b (see FIG. 2) close. By simultaneously plugging into the jack circuit 41 when restarting the tape recorder, the test man will also hear the voice message on the tape describing the subscriber line number and contactor number which were busy at the time of test and a notation can be made by him to permit reinspection of the line.

At the end of the interruptions in the tone signal corresponding to the subscriber line numbers, a ten second tone signal appears causing the pulsing relay 46 to hold up and the line control circuit relays 54, 64, 70 and 78 to release in a timed sequence as shown in FIG 7. Operation of the relay 46 opens contacts 46a and closes contacts 46b. Opening of the contacts 46a releases the relay 54. Release of the relay 54 opens the contacts 54a which in turn open contacts 64a and 64b. Opening of the contacts 64a disconnects the supply 56 from the test distributor switch. Opening of the contacts 64b releases the relay 70 which in turn opens the contacts 70a to release the relay 78.

On release of the relay 70, the contacts 70b and 70c open and disconnect the pulsing and busy test circuit from the subscriber line. Simultaneously, the contacts 70d and 70e close extending the subscriber line to the detector for testing purposes. Before release of the relay 78, the contacts 78b are closed and the contacts 78c are opened which permits the supply 84 to be connected to the ring line, the supply 84 charging up the line capacitance of the ring line to prevent false resistance measurements from being made by the detector circuit.

On release of the relay 78, the contacts 78b open and the contacts 78b (see FIG. 4) close disconnecting the charging circuit from the ring line and connecting the detector circuit to the ring line, respectively. The contacts 78a (see FIG. 3) are also opened disconnecting the supply 84 from the office selector and advance circuit but the six second discharge period of the timing circuit connected to the grid of the tube 110 prevents conduction thereof while the resistance test (which lasts the remaining two seconds of the ten second pulse) is being made by the detector circuit. Hence, it is believed apparent that the office selector circuit cannot advance to the next test distributor switch until the long pulse of 45 seconds' duration appears on the tape.

If the resistance between the ring and tip lines is more than the calibrated bias (500,000 ohms) of the tube 88, conduction thereof does not occur and the trouble indicating circuit, which is connected to the cathode of the tube 88, is not operated. Shortly thereafter the tone signal on the tape is removed and the voice message appears which causes the pulsing relay to release and the line control circuit relays 54, 64, 70 and 78 to hold up as shown in FIG. 7. With the line control circuit relays operated, the dialing and detector circuit remains connected to the same test distributor switch and is readied for the next pulsing transmission by the closing of the contacts 70b and 70c and the opening of the contacts 70d, 70e and 78c.

In the event that the resistance between the ring line and ground is less than the calibrated bias of the tube 88, such bias is essentially short circuited by the low ring-to-ground resistance and conduction of the tube occurs. Conduction of the tube causes current flow in the opposing coil 93 of the polar relay causing operation thereof and closing of the contacts 91a. When the contacts 91a make, the electric circuit of the trouble relay 132 is completed causing operation thereof. It should be noted that the contacts 70f included in the trouble relay electric circuit are closed since, as previously mentioned, the relay 70 is released during the time the detector circuit is connected to the ring line. Operation of the trouble relay closes contacts 132a and 132b, the former contacts opening the electric circuit of the busy relay and the latter contacts causing lock up of the trouble relay. The contacts 132c are operated by the trouble relay which connects the stop relay 144 to ground terminating the operation of the tape recorder by the opening of contacts 144a and 144b (see FIG. 2). The relay 132 operates the contacts 132d and 132e to light the lamp 151 and sound the buzzer 150.

The attendant can release the trouble relay by either operating the release key 140 or plugging into the test jack 142 located at the test board. Plugging into the test jack 142 and the output jack 40 of the tape recorder causes release of the contacts 132c which opens the electric circuit of the stop relay 144 to restart the tape recorder by the contacts 144a and 144b closing. The next signal appearing in the output jack is the voice message placed on the tape which indicates the subscriber line number and defective contactor number which permits the attendant to take the necessary action to have the subscriber line and contactor inspected and repaired by a man in the field. Thereafter the alarm testing device then continues to the next subscriber number to test and inspect the line in the manner previously described.

After the subscriber lines have been inspected for the selected test distributor switch, a long tone of 45 seconds' duration and identical to the first tone on the tape appears, the tone causing operation of the office selector and advance circuit to the next test distributor switch in the manner previously described. Thereafter busy testing and resistance inspection of the selected subscriber lines for the next test distributor switch proceed in the manner previously described.

To terminate the testing cycle, the last number dialed in the last exchange area inspected is a permanent trouble condition which causes the trouble relay to operate and stop tape recorder in the manner previously described. The audio message on the tape following the dialed number informs the attendant that the test cycle is completed. Thereafter, the attendant can stop the recorder and rewind the tape for the next test cycle. When the recorder is stopped the stepping switch is reset to the position shown in FIG. 5 by suitable circuitry (not shown) which is believed to be well known to a worker skilled in the telephone art.

The present invention can be assembled on a single chassis except for the tape recorder which is a unit by itself. These two packages make the invention portable and easy to shift from one central office to another. Moreover, the circuit elements included in the present invention are commercially available and relatively inexpensive which makes the alarm testing apparatus of the present invention of relatively low initial cost.

The automatic operation of the alarm testing device eliminates the necessity for the skilled technician to devote full attention to the testing and inspecting of the subscriber lines having alarm devices connected thereto. The reduction in man hours for this task represents a considerable savings to telephone companies. Moreover, the alarm testing device provides positive and rapid identification of a troubled subscriber line which permits such conditions to be remedied quickly. Finally, alterations and additions can be easily made to the tape which permits the testing program to be revised without any changes in the wiring at the central office.

It is to be understood that the above embodiment is only illustrative of the principles of the invention. Numerous other embodiments may be devised by those skilled in the art without departing from the spirit and scope of the present invention.

What is claimed is:

1. An automatic alarm testing device comprising means for recording a plurality of subscriber numbers for selected subscriber lines, means for translating the recorded subscriber numbers into a form suitable for operating a line control circuit, said line control circuit including means for operating an office selector circuit and a dialing and detector circuit, said office selector circuit having a plurality of output circuits one of which is selected by said line control circuit to interconnect the dialing and detector circuit and each subscriber line for a busy test and resistance level measurement, a trouble indicating circuit responsive to the dialing and detector circuit to indicate either a busy condition or a resistance level below a pre-selected value on any subscriber line, means responsive to said trouble indicating circuit for terminating the operation of the recording means, and means for restarting the recording means and identifying with audio signals the subscriber lines causing operation of the trouble indicating circuit.

2. An automatic alarm testing device comprising means for recording a plurality of subscriber numbers for selected subscriber lines, means for translating the recorded subscriber numbers into a form suitable for operating a line control circuit, said line control circuit including means for operating an office selector circuit and a dialing and detector circuit, said office selector circuit having a plurality of output circuits one of which is selected by said line control circuit to interconnect the dialing and detector circuit and each subscriber line for a busy test and resistance level measurement, said dialing and detector circuit comprising pulsing contacts, a detector device, means for establishing the operating point of the detector device, and means for charging the output circuit before the detector is connected thereto, contacts controllable by said line control circuit to connect alternately the pulsing contacts and the detector circuit to said output circuit, a trouble indicating circuit responsive to the dialing and and detector circuit and indicating either a busy condition or a resistance level below a preselected value of any subscriber line, said trouble indicating circuit including a polar relay responsive to either a busy condition on the subscriber line or an output from the dialing and detector circuit indicative of a resistance level of any selected subscriber line below a preselected value, means responsive to said trouble indicating circuit for terminating the operation of the recording means, and means for restarting the recording means and identifying with audio signals the subscriber line causing operation of the trouble indicating circuit.

3. An automatic alarm testing device comprising means for recording a plurality of subscriber numbers for selected subscriber lines, means for translating the recorded subscriber numbers into a form suitable for operating a line control circuit, said line control circuit including means for operating an office selector circuit and a dialing and detector circuit, said office selector circuit having a plurality of output circuits one of which is selected by said line control circuit to interconnect the dialing and detector circuit and each subscriber line for busy test and resistance level measurement, a trouble indicating circuit responsive to the dialing and detector circuit and indicating either a busy condition or a resistance level below a preselected value on any subscriber line, said trouble indicating circuit including a polar relay responsive to either a busy condition or an output from the dialing and detector circuit indicative of resistance level of any selected subscriber line below a preselected value, a busy relay responsive to said polar relay for illuminating a first lamp and sounding a buzzer to indicate the operation of the busy relay, a trouble relay responsive to the operation of the polar relay for illuminating a second lamp and sounding a buzzer to indicate the operation of the trouble relay, means for preventing operation of the busy relay upon operation of the polar relay, means responsive to said trouble indicating circuit for terminating the operation of the recording means, and means for restarting the recording means and identifying with audio signals the subscriber line causing operation of the trouble indicating circuit.

4. An automatic alarm testing device comprising means for recording a plurality of subscriber numbers for selected subscriber lines, means for translating the recorded subscriber numbers into a form suitable for operating a line control circuit, said line control circuit including means for operating an office selector circuit and a dialing and detector circuit, said office selector circuit having a plurality of output circuits one of which is selected by said line control circuit to interconnect the dialing and detector circuit and each subscriber line for busy test and resistance level measurements, a trouble indicating circuit responsive to the dialing and detector circuit and indicating a busy condition or a resistance level below a preselected value of any subscriber line, means responsive to said trouble indicating circuit for terminating the operation of the recording means, a recorder stop circuit responsive to the operation of the trouble indicating circuit and terminating the operation of said recorder means, and a release circuit for resetting the trouble or busy relay upon operation thereof and restarting the recording means, said release circuit including means for receiving recorded audio signals identifying the subscriber line causing operation of the trouble indicating circuit.

5. In a telephone system including a plurality of telephone lines connected to an exchange having automatic switching equipment responsive to dialing signals, an automatic testing and alarm system comprising a plurality of remote indicating devices, each associated with a telephone line and capable of indicating the presence of either of two conditions, record means having recorded thereon a succession of dialing signals each being a signal capable of causing said switching equipment to select a different one of said telephone lines associated with an indicating device, said record means having also recorded thereon after each of said dialing signals an audio signal identifying the telephone line associated with said dialing signal, test means connectable to each of said telephone line associated with one of said indicating devices for determining which of said two conditions is present, dialing means for supplying said recorded dialing signals in succession to said automatic dialing equipment and thereby connecting said test means to said telephone lines in succession, said test means being responsive to indications of said conditions for stopping the operation of said dialing means if said test means receives an indication of one of said conditions on the telephone line to which it is connected and for permitting said dialing means to proceed with the supplying of the dialing signal for the next telephone line if said test means receives an indication of the existence of the other of said conditions, and means for reading out the recorded identification of the telephone line following the recorded dialing signal for that line after the dialing means has stopped in response to an indication of said one condition.

6. Automatic testing and alarm equipment for use with a telephone system which system comprises a plurality of telephone lines connected to an exchange having automatic switching equipment responsive to dialing signals, a plurality of remote indicating devices, each associated with a telephone line, capable of indicating the presence of either of two conditions, said automatic testing and alarm equipment comprising record means having recorded thereon a succession of dialing signals each being a signal capable of causing said switching equipment to select a different one of said telephone lines associated with an indicating device, said record means having also recorded thereon after each of said dialing signals an audio signal identifying the telephone line associated with said dialing signal, test means connectable to each said telephone line associated with one of said indicating devices for determining which of said two conditions is present, dialing means for supplying said recorded dialing signals in succession to said automatic dialing equipment and thereby connecting said test means to said telephone lines in succession, said test means being responsive to indications of said conditions for stopping the operation of said dialing means if said test means receives an indication of one of said conditions on the telephone line to which it is connected and for permitting said dialing means to proceed with the supplying of the dialing signal for the next telephone line if said test means receives an indication of the existence of the other of said conditions, and means for reading out the recorded identification of the telephone line following the recorded dialing signal for that line after the dialing means has stopped in response to an indication of said one condition.

7. In a telephone system a central office including a test board, a plurality of subscriber lines extending from said central office, selected subscriber lines having contacter devices attached thereto, said contacter devices being responsive to pressure changes in a gas pressurized cable by placing a low resistance on the selected subscriber line to which the contacter is attached, an alarm testing device having erasable program means for operating a dialing and detector circuit and an office selecter circuit to connect automatically and successively to said selected subscriber lines through said test board, said erasable program means comprising a tape recorder having recorded signals on the tape describing the numbers of the selected subscriber lines to be inspected, and means for converting the recorded signals into corresponding electrical signals for operating the dialing and detector circuit, said alarm testing device testing each selected line individually for a busy condition and resistance level, said alarm testing device stopping at a selected subscriber line in a busy condition or having a resistance level below a preselected value, a trouble indicating circuit for indicating the cause of stoppage at the selected subscriber line, means for restarting the operation of the alarm testing line and identifying with audible signals the subscriber line causing the stoppage of the alarm testing device, and means for terminating the operation of the alarm testing device after completion of the busy and resistance tests for the last selected subscriber line.

References Cited in the file of this patent
UNITED STATES PATENTS

| | | |
|---|---|---|
| 2,266,503 | Long et al. | Dec. 16, 1941 |
| 2,298,519 | Tillman | Oct. 13, 1942 |
| 2,328,750 | Smith et al. | Sept. 7, 1943 |
| 2,393,236 | Corey et al. | Jan. 22, 1946 |
| 2,692,308 | Vaniman | Oct. 19, 1954 |
| 2,721,910 | Avery | Oct. 25, 1955 |
| 2,827,515 | Zuber | Mar. 18, 1958 |